US012479249B1

(12) United States Patent
Pescara et al.

(10) Patent No.: US 12,479,249 B1
(45) Date of Patent: Nov. 25, 2025

(54) ASSEMBLED SUSPENSION CONNECTION METHOD FOR UNDERSLUNG AXLE

(71) Applicant: Dana Automotive Systems Group, LLC, Maumee, OH (US)

(72) Inventors: Anthony Pescara, Oregon, OH (US); Trent Marble, Maumee, OH (US); Ali Saeedy, Rochester Hills, MI (US); Virginia Skinner, Temperance, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/769,862

(22) Filed: Jul. 11, 2024

(51) Int. Cl.
*B60G 3/14* (2006.01)

(52) U.S. Cl.
CPC ........ *B60G 3/14* (2013.01); *B60G 2204/4306* (2013.01)

(58) Field of Classification Search
CPC ... B60G 3/01; B60G 3/12; B60G 3/14; B60G 2204/40; B60G 2204/4306
USPC ....................................... 280/124.1, 124.125
See application file for complete search history.

(56) References Cited

U.S. PATENT DOCUMENTS

| | | | | |
|---|---|---|---|---|
| 4,615,539 A * | 10/1986 | Pierce | .................... | B60G 9/003 180/905 |
| 4,722,549 A | 2/1988 | Raidel | | |
| 5,112,078 A * | 5/1992 | Galazin | .................... | B60G 7/02 280/124.116 |
| 5,639,110 A * | 6/1997 | Pierce | .................... | B60G 9/003 280/124.11 |
| 8,382,128 B2 * | 2/2013 | Henksmeier | .......... | B62D 17/00 280/86.758 |
| 8,632,085 B2 * | 1/2014 | Davenport | ............. | B60G 9/003 280/124.128 |
| 8,967,639 B2 * | 3/2015 | Conaway | ............... | B60G 11/28 280/124.128 |
| 2014/0035250 A1 * | 2/2014 | Dilworth | ................ | B60G 11/04 280/124.111 |

FOREIGN PATENT DOCUMENTS

| | | | | | |
|---|---|---|---|---|---|
| BR | 102015026774 A2 | * | 8/2016 | ........... | B60B 35/008 |
| CA | 2979179 C | * | 1/2024 | ........... | B60G 11/113 |
| CN | 105408137 A | * | 3/2016 | ............... | B60G 3/20 |
| DE | 19704124 A1 | * | 9/1997 | ........... | B60G 11/113 |
| JP | 3238710 B2 | * | 12/2001 | ............. | B60B 35/08 |
| NZ | 215090 A | | 2/1988 | | |
| WO | WO-2008109585 A1 | * | 9/2008 | ........... | B60G 11/113 |

OTHER PUBLICATIONS

Description Translation for DE 19704124 from Espacenet (Year: 1997).*

* cited by examiner

*Primary Examiner* — Jason D Shanske
*Assistant Examiner* — Daniel M. Keck
(74) *Attorney, Agent, or Firm* — McCoy Russell LLP

(57) ABSTRACT

Systems are provided for a support. In one example, a system includes a suspension bracket assembly comprising: a forged body; a stamped plate; and a pair of bushing pins; the forged body comprising a U-shaped portion configured to be welded to an axle housing, the stamped plate comprising a plurality of appendages configured to be fastened to the forged body via a first set of first fasteners; and the pair of bushing pins configured to be interposed between the stamped plate and the forged body, where the bushing pins are fastened via a second set of second fasteners.

19 Claims, 7 Drawing Sheets

ASSEMBLED SUSPENSION CONNECTION METHOD FOR UNDERSLUNG AXLE

TECHNICAL FIELD

The present description relates to a bracket with a forged and a stamped component that supports a bar-pin style bushing. The bracket is joined to an axle housing of an underslung axle and supports a lower control arm.

BACKGROUND AND SUMMARY

Suspension brackets in vehicles can impact packaging, weight, strength, etc., and may use forged brackets or stamped brackets, with various advantages and disadvantages. For example, a forged bracket may be greater in weight compared to a stamped bracket. However, the stamped bracket may lack the desired compressive, tensile, or sheer strengths to support loads received by a lower control arm.

The above issues may be addressed by a suspension bracket assembly comprising: a forged body; a stamped plate; and a pair of bushing pins; the forged body comprising a U-shaped portion configured to be welded to an axle housing, the stamped plate comprising a plurality of appendages configured to be fastened to the forged body via a first set of first fasteners; and the pair of bushing pins configured to be interposed between the stamped plate and the forged body, where the bushing pins are fastened via a second set of second fasteners.

The suspension bracket assembly may be of a reduced weight compared to a bracket or bracket assembly comprising only forged structural bodies. Further, the clamping and fastening provided by the stamped plate allows for the forged body to be shaped to further reduce mass compared to other forged brackets and forged bracket assemblies. The forged body provides the bracket assembly with increased rigidity for resistance to mechanical forces, for example: compressive, tensile, and sheer forces, compared to a bracket or bracket assembly comprising structures that are stamped components. The stamped plate also allows for elastic shape change and give for the bracket assembly in response to mechanical forces.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a support structure of an axle assembly, that may support a control arm for a wheel and a wheel hub assembly. The support structure is a bracket and may be physically coupled to an axle shaft housing of the axle assembly. The bracket includes a first component, that may be referred to as a forged body. The forged body is a structure shaped via a forging technique. The bracket includes a second component, that may be referred to as a stamped plate. The stamped plate is shaped via stamping. The stamped plate may be a tab. The stamped plate may be fastened to the forged body via a plurality of fasteners. One or more of a plurality of bushings may be physically coupled to the bracket via being sandwiched between the forged body and stamped plate. When fastened, the stamped plate may clamp against the one or more bushings. Additionally, the one or more bushings may be fastened to the forged body and the stamped plates via another set of fasteners. For example, the bushings may include bushing pins of a bar-pin configuration.

The forged body comprises a U-shaped portion that may be joined to the axle housing. For example, the U-shaped portion may curve around and abut a portion of the axle housing. The U-shaped portion may be joined to the axle housing via welding. The U-shaped portion includes a window via which the U-shaped portion may be welded to the axle housing.

The forged body and the stamped plate have portions that extend in an outward direction from the axle shaft housing. The first component includes a first appendage and a second appendage that may each abut and press against features of the bushing pins, clamping the bushing pins to the assembly. A set of fasteners may extend through the first appendage and the second appendage through the features of the bushings and into the component. The bushing pins may be fastened to the bracket assembly via the set of fasteners. When tightened, the fasteners may increase clamping from the first appendage and the second appendage to the bushing pins.

Figure 1:
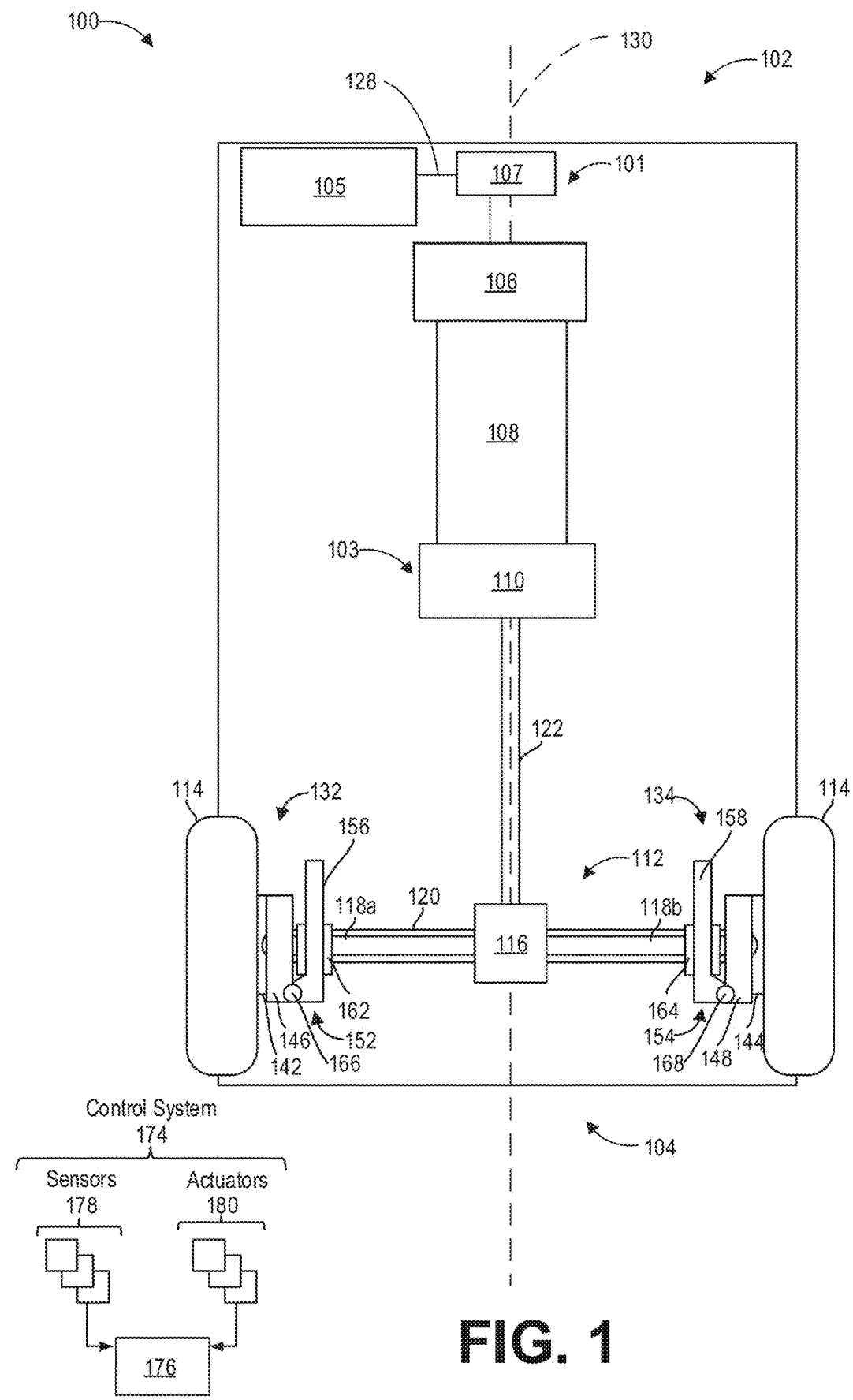
FIG. 1 shows an example schematic of a vehicle that including an axle assembly of the present disclosure.
Figure 2:
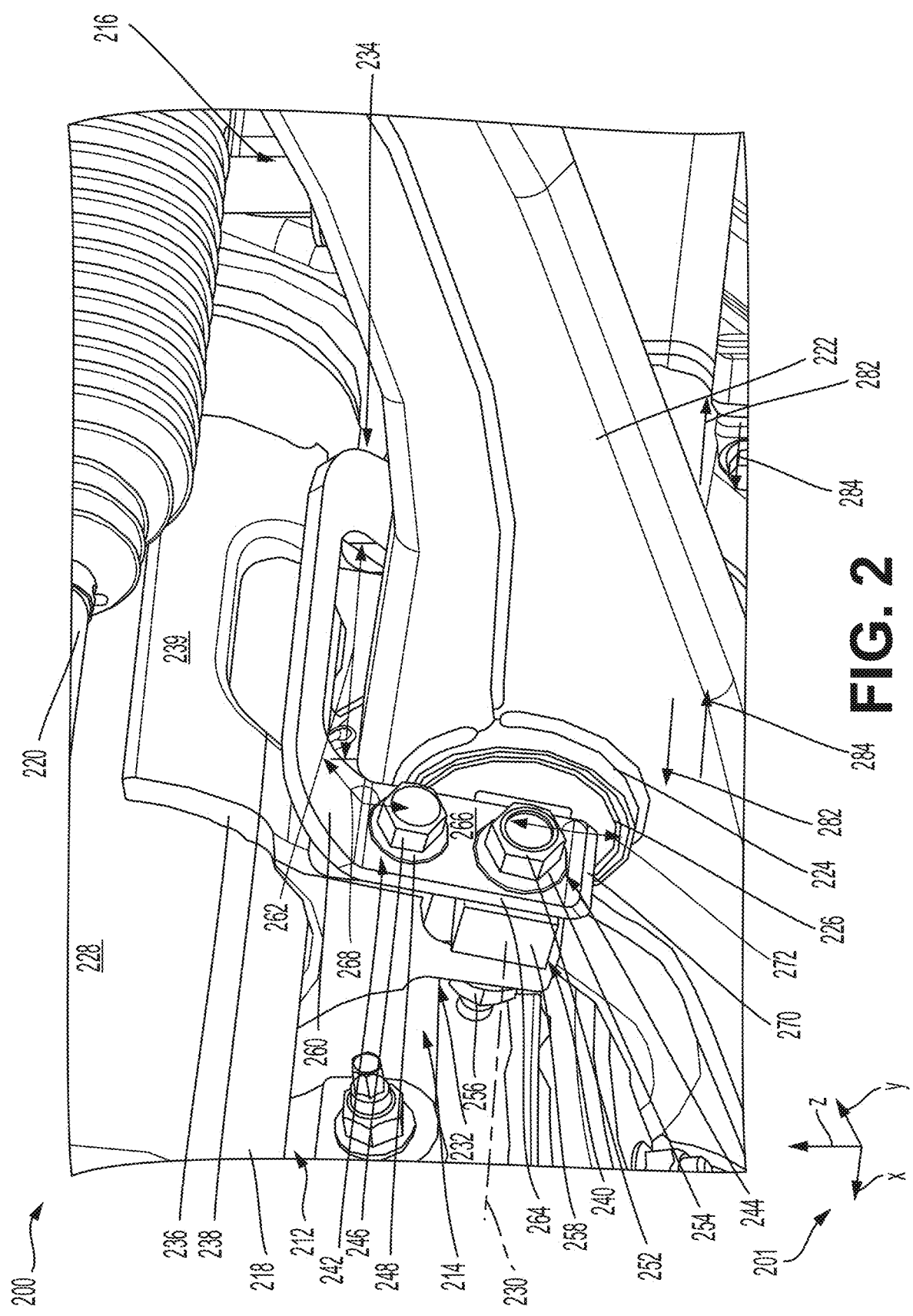
FIG. 2 shows a side view of axle assembly including a bracket assembly and an arm for steering.
Figure 3:
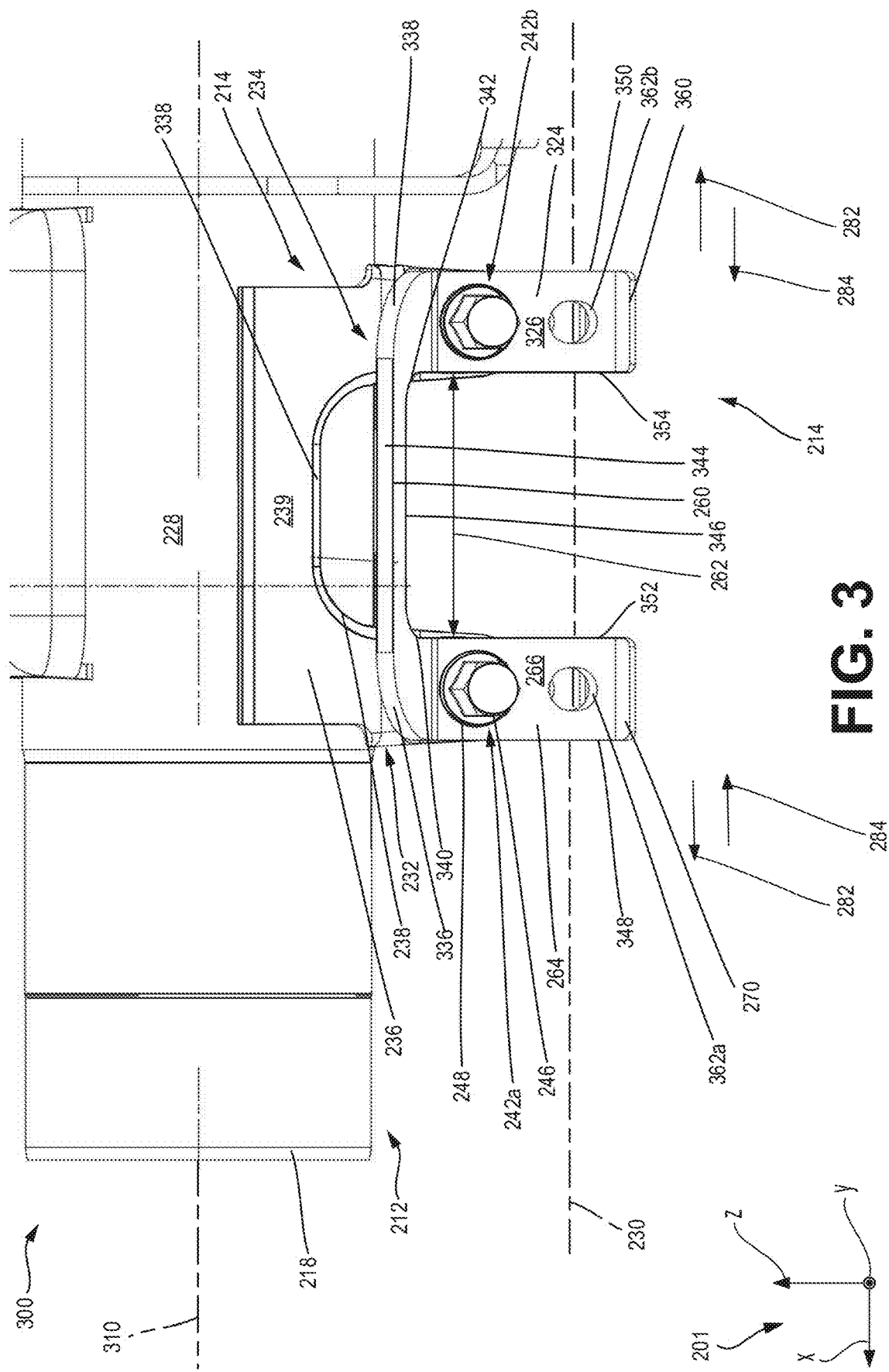
FIG. 3 shows a side view of the bracket assembly fastened to an axle housing.
Figure 4:
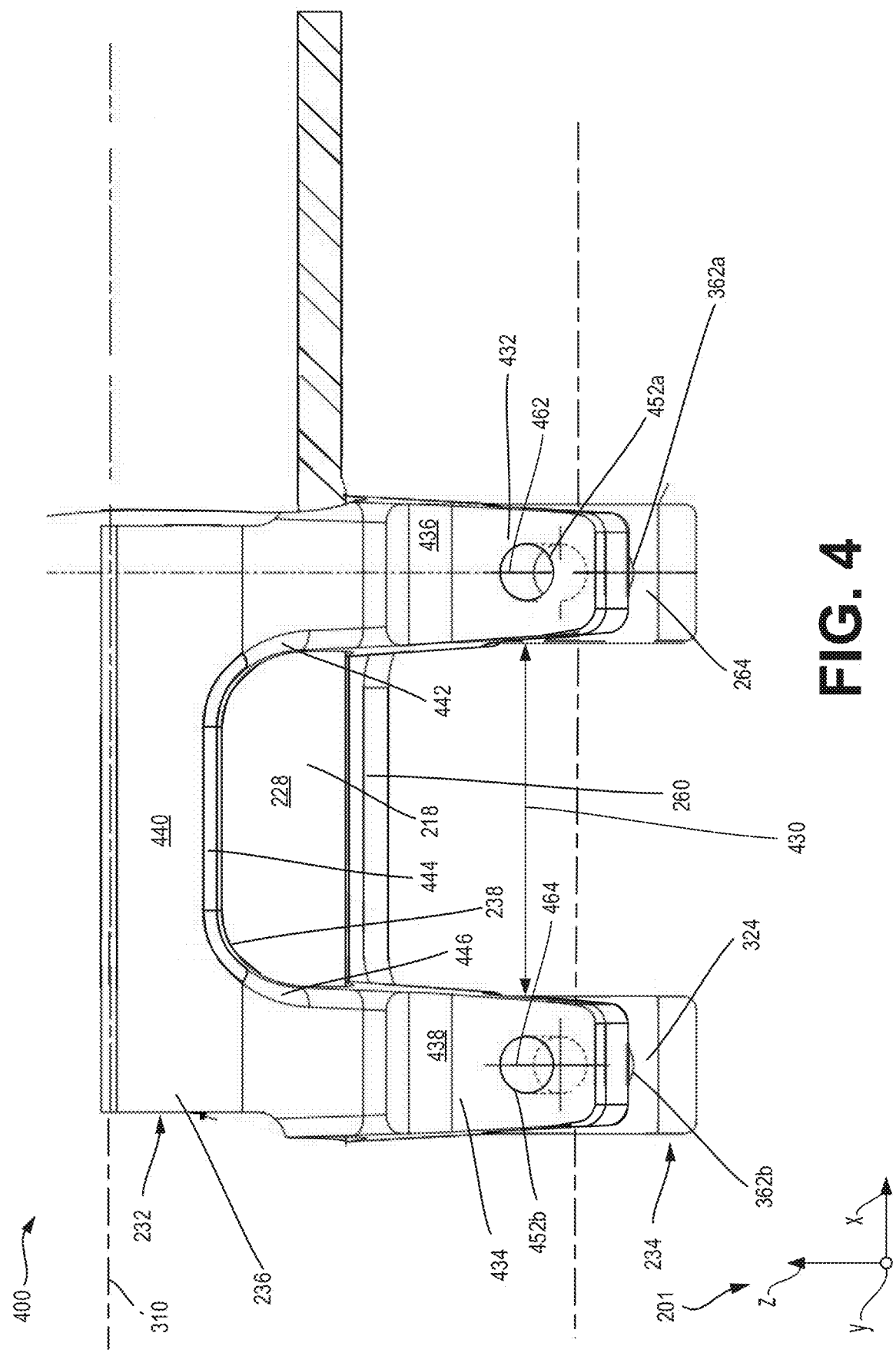
FIG. 4 shows another side view of the bracket assembly fastened to the axle housing.
Figure 5:
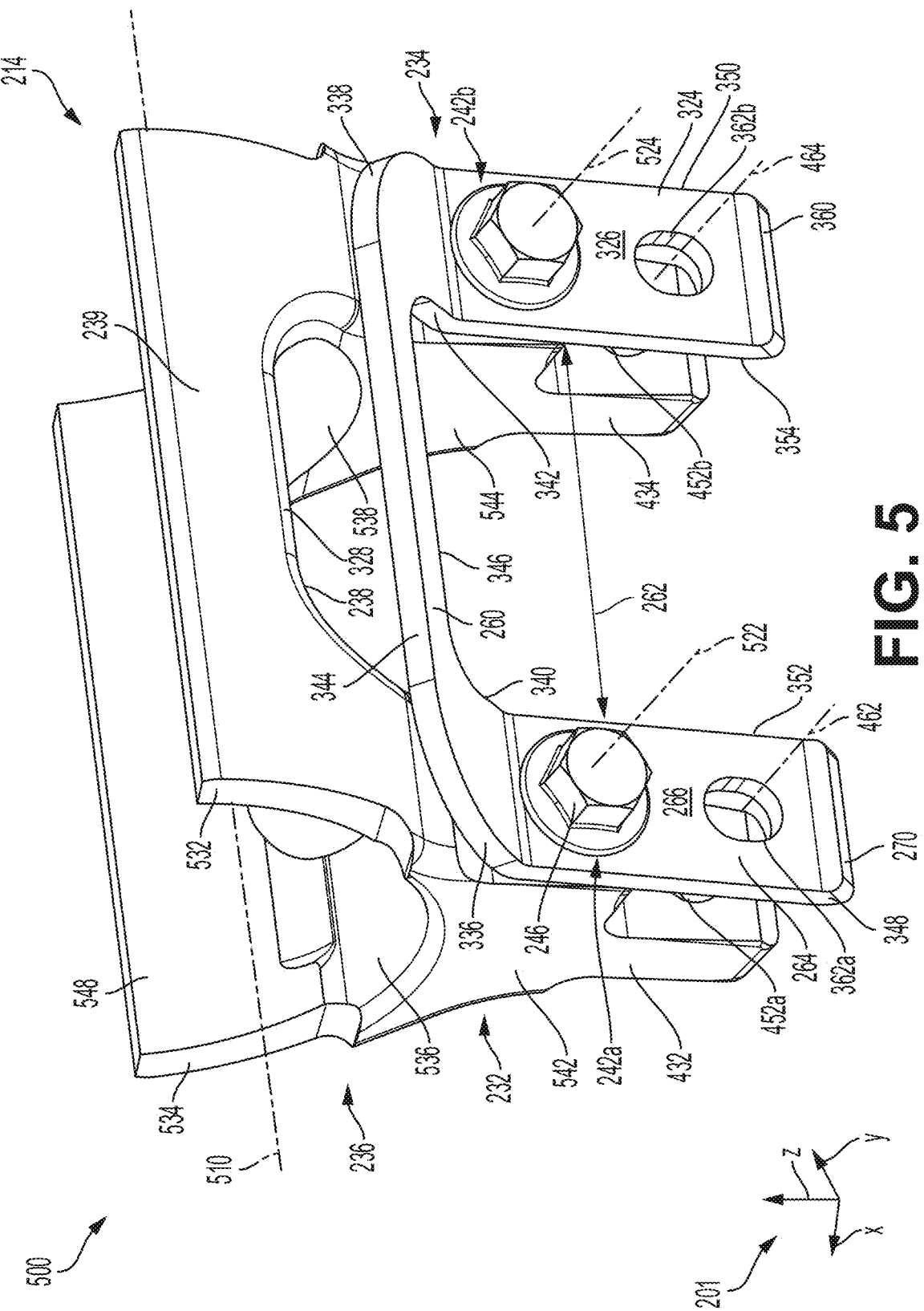
FIG. 5 shows a side view of the bracket assembly separate from the axle housing.
Figure 6:
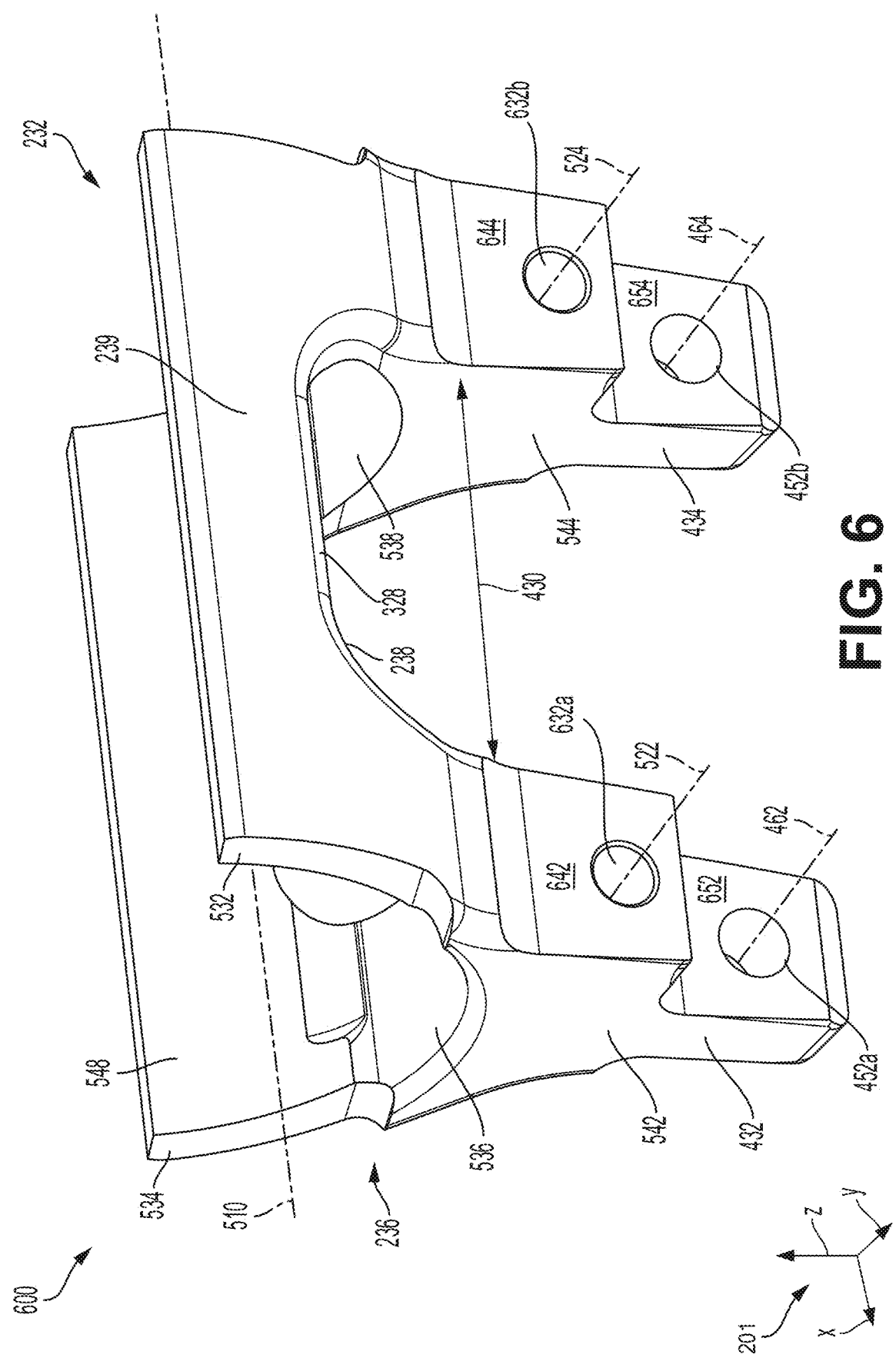
FIG. 6 shows a side view of a forged body of the bracket assembly.
Figure 7:
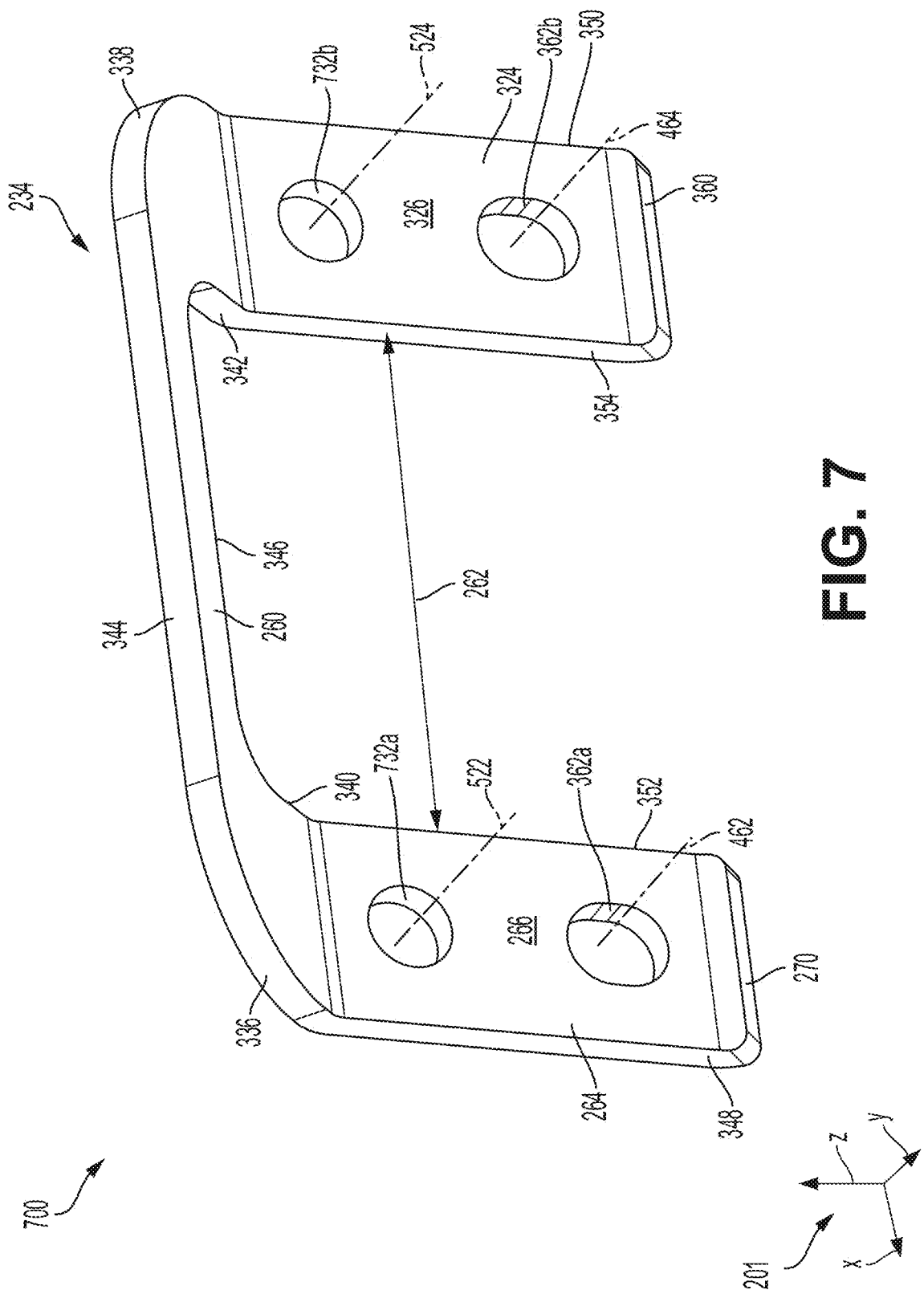
FIG. 7 shows a side view of a stamped plate of the bracket assembly.

FIG. 1 shows an example schematic of a vehicle including an axle assembly of the present disclosure. FIG. 2. shows a side view of axle assembly including a bracket assembly and an arm for steering. FIG. 3 shows a side view of the bracket assembly fastened to an axle housing. FIG. 4 shows another side view of the bracket assembly fastened to the axle housing. The other side view of FIG. 4 is opposite to the side view of FIG. 3. FIGS. 3-4 show the bracket assembly and the axle housing separate from the arm of FIG. 2. FIG. 5 shows a side view of the bracket assembly separate from the axle housing. FIG. 6 shows a side view of a forged body of the bracket assembly. The forged body is shown separate from other components of the bracket assembly in FIG. 6. FIG. 7 shows a side view of a stamped plate of the bracket assembly. The stamped plate is shown separate from the other components of the bracket assembly in FIG. 7. The forged body of FIG. 6 is a forged component created via forging techniques. The stamped plate of FIG. 7 is a stamped component created via stamping techniques.

It is also to be understood that the specific assemblies and systems illustrated in the figures, and described below are exemplary embodiments of the inventive concepts defined herein. For purposes of discussion, the drawings are described collectively. Thus, like elements may be commonly referred to herein with like reference numerals and may not be re-introduced.

FIGS. 1-2 show schematics of example configurations with relative positioning of the various components. FIGS. 3-7 show example configurations with approximate positioning. FIGS. 3-7 are shown approximately to scale; though other relative dimensions may be used. As used herein, the terms "approximately" is construed to mean plus or minus five percent of the range unless otherwise specified.

Further, FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified. Features described as tangential may extend linearly from a point on a circumference that is radially about an axis or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Components described as drivingly coupled are coupled such as to drive one another. Said in another way, a first component drivingly coupled to a second component may drive the second component and vice versa. Said in another way, rotational power may be transferred from a first component to a second component when the first component drivingly couples the second component. A component described as a driving component may drive another component. A component described as a driven component may be driven.

Turning to FIG. 1, a vehicle 100 is shown comprising a powertrain 101 and a drivetrain 103. The vehicle 100 may have a front end 102 and a rear end 104, located on opposite sides of vehicle 100. Objects, components, and features of the vehicle 100 referred to as being located near the front may be closest to the front end 102 compared to the rear end 104. Objects, components, and features of the vehicle 100 referred to as being located near the rear may be closest to the rear end 104 compared to the front end 102. The vehicle 100 may have a longitudinal axis 130. The powertrain 101 and drivetrain 103 may each have a length parallel with the longitudinal axis 130. The vehicle 100 includes an axle assembly 112. More specifically, the drivetrain 103 includes the axle assembly 112. Rotary power generated by the vehicle 100 may drive the axle assembly 112.

The axle assembly 112 may be configured to drive a set of wheels 114. For an example, the axle assembly 112 is arranged near the rear of the vehicle 100 and thereby comprises a rear axle. However, it is to be appreciated that the location of the axle assembly 112 may be non-limiting. For another example, the axle assembly 112 may be arranged near the front of the vehicle 100 and thereby comprises a front axle. For another example, the axle assembly 112 may be arranged near another part of the vehicle 100. The drivetrain 103 may output torque to the axle assembly 112. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

The vehicle 100 may be a commercial vehicle, light, medium, or heavy duty vehicle, a passenger vehicle, an off-highway vehicle, a commercial vehicle, agricultural vehicle, and/or sport utility vehicle. For an example embodiment, the vehicle 100 may be a wheeled vehicle, such as an automobile. Additionally or alternatively, the vehicle 100 may be a plane, a boat, or other vehicle system that utilizes the axle assembly 112. Additionally or alternatively, the vehicle 100 and/or one or more of its components, such as components of the powertrain 101 and/or drivetrain 103, may be used in industrial, locomotive, military, agricultural, and/or aerospace applications.

The powertrain 101 includes a prime mover 106 and a transmission 108 (e.g., a gear train). For an example, the prime mover 106 may be an internal combustion engine (ICE). For another example, the prime mover 106 may be an electric machine, such as an electric motor or an electric motor/generator. The prime mover 106 is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The vehicle 100 may be of a configuration that has all-electric modes of operation, such as an all-electric vehicle or a plug-in hybrid vehicle. In an all-electric vehicle, the prime mover 106 may be an electric machine. For example, the prime mover 106 may be an electric motor/generator. The vehicle 100 may be an all-electric vehicle with one or more of plurality of electric machines configures to supply power to the axle assembly 112. The vehicle 100 may be a hybrid vehicle, wherein there are multiple torque inputs to the transmission 108. There may be other movers that may drive and are housed by the vehicle 100 that drivingly couple and have torque inputs to the transmission 108 besides prime mover 106. The vehicle 100 may include a plurality of electric machines, such as if a plug-in hybrid vehicle. One or more of the electric machines may drivingly couple and have torque inputs to the transmission 108.

The vehicle 100 may be a hybrid vehicle including both an engine and one or more of a plurality electric machines each configured to supply rotary power to the axle assembly 112. The prime mover 106 may be powered via energy from an energy storage device 105, such as if the prime mover 106 is an electric machine. In one example, the energy storage device 105 is a battery, such as a traction battery, configured to store electrical energy. One or more of a plurality of inverters 107 may be arranged between the energy storage device 105 and the prime mover 106 and configured to adjust direct current (DC) to alternating current (AC) and vice versa. The inverters 107 may include a variety of components and circuitry with thermal demands that effect an efficiency of the inverter. Electrical components may be electrically coupled via a plurality of electrical connections 128.

For example, the axle assembly 112 may be driven via power originating from an engine in a first operating mode where an electric machine is not operated to provide power (e.g., an engine-only mode). The axle assembly 112 may be driven via power originating from the electric machine in a second operating mode where the engine is not operated to provide power (e.g., an electric-only mode). The axle assembly 112 may be driven via power originating from both the engine and the electric machine in a third operating mode (e.g., an electric assist mode). As another example, the axle assembly 112 may be an electric axle assembly configured to be driven by an integrated electric machine.

The drivetrain 103 may include a driveshaft 122 configured to receive rotary power output by the transmission 108. The driveshaft 122 may drivingly couple and transmit rotary power from the transmission 108 to the axle assembly 112. The driveshaft 122 may be positioned to extend in parallel with the longitudinal axis 130. For an example of a configuration of vehicle 100, the driveshaft 122 may be centered about the longitudinal axis 130. The transmission 108 may be drivingly coupled to the axle assembly 112 via the driveshaft 122. Said in another way, the transmission 108 may drive the driveshaft 122, and the driveshaft 122 may drive the axle assembly 112. The driveshaft 122 may be a rear driveshaft, that may deliver rotary power to drive the vehicle 100 from the rear, such as for a rear wheel drive. However, it is to be appreciated that for alternate configurations of the drivetrain 103, the driveshaft 122 may be a front driveshaft, transferring rotary power to drive the vehicle 100 from the front, such as for a front wheel drive. For another example, the driveshaft 122 may be a front drive shaft, such as if the axle assembly 112 is at the front of the vehicle 100. In some configurations, such as shown in FIG. 1, the drivetrain 103 includes a transfer case 110 configured to receive rotary power output by the transmission 108. The driveshaft 122 may drivingly couple to the transfer case 110 and may be drivingly coupled to the transmission 108 via the transfer case 110.

The axle assembly 112 may include a differential 116, an axle housing 120, and a set of axle shafts. The differential 116 may drivingly couple the set of axle shafts such as to transfer torque to and drive the first set of axle shafts. The set of axle shafts may include a first shaft 118*a* and a second shaft 118*b*. The first shaft 118*a* and the second shaft 118*b* may be axle half shafts. The axle housing 120 may house the first shaft 118*a* and the second shaft 118*b*. The differential 116 may distribute unequal torque to wheels drivingly coupled at opposite ends of the axle assembly 112. For example, the differential 116 may distribute unequal torque to the first shaft 118*a* and the second shaft 118*b*. The first shaft 118*a* and the second shaft 118*b* may each drive one or more wheels of the set of wheels 114.

The shafts 118*a*, 118*b* may drivingly couple to the set of wheels 114 via a set of wheel end assemblies. For example, the set of wheel end assemblies may include a first wheel end assembly 132 and a second wheel end assembly 134. The first wheel end assembly 132 may drivingly couple to one or more wheels of the set of wheels 114. Likewise, the second wheel end assembly 134 may drivingly couple to one or more wheels of the set of wheels 114. Wheels drivingly coupled to the first wheel end assembly 132 may be opposite the axle assembly 112 from the wheels drivingly coupled to the second wheel end assembly 134. The first shaft 118*a* may drivingly couple to the first wheel end assembly 132. The second shaft 118*b* may drivingly couple to the second wheel end assembly 134. Torque output by the differential 116 to the first shaft 118*a* may drive the first wheel end assembly 132 and one or more wheels of the wheels 114 coupled to the first wheel end assembly 132. Torque output by the differential 116 to the second shaft 118*b* may drive the second wheel end assembly 134 and one or more wheels of the wheels 114 coupled to the second wheel end assembly 134.

The first wheel end assembly 132 includes a first hub assembly 142, a first steering knuckle 146, and a first control arm assembly 152. The second wheel end assembly 134 includes a second hub assembly 144, a second steering knuckle 148, and a second control arm assembly 154. The first and second hub assemblies 142, 144 are wheel hub assemblies that may rigidly couple to the wheels 114.

For example, the first hub assembly 142 may rigidly couple to one or more wheels of the set of wheels 114. The first hub assembly 142 may rigidly couple to the first shaft 118*a*. Likewise, the first steering knuckle 146 may rigidly couple to the first hub assembly 142. Alternatively, the first hub assembly 142 may comprise the first steering knuckle 146. The first control arm assembly 152 may couple to the first steering knuckle 146, such as to receive rotational loads and other mechanical loads from forces placed on the first hub assembly 142 and the first steering knuckle 146.

The second hub assembly 144 may rigidly couple to one or more wheels of the set of wheels 114. The second hub assembly 144 may rigidly couple to one or more wheels that are opposite the axle assembly 112 from first hub assembly 142 and the one or more wheels rigidly coupled to the second hub assembly 144. The second hub assembly 144 may rigidly couple to the second shaft 118*b*. Likewise, the second steering knuckle 148 may rigidly couple to the second hub assembly 144. Alternatively, the second hub assembly 144 may comprise the second steering knuckle 148. The second control arm assembly 154 may couple to the second steering knuckle 148, such as to receive rotational loads and other mechanical loads from forces placed on the second hub assembly 144 and the second steering knuckle 148.

A suspension system of the axle assembly 112 may include the first control arm assembly 152 and the second control arm assembly 154. The first control arm assembly 152 may include a first control arm 156 and a first bracket 162. The second control arm assembly 154 may include a second control arm 158 and a second bracket 164. The first and second control arms 156, 158 may be lower control arms, where the first and second control arms 156, 158 may be positioned below the axle assembly 112 with respect to the direction of gravity. The first and second brackets 162, 164 are suspension brackets that may physically couple to the axle assembly 112.

For example, the first bracket 162 and the second bracket 164 may rigidly couple to the axle housing 120. A first joint 166 may pivotably couple the first control arm 156 to the first steering knuckle 146. A second joint 168 may pivotably couple the second control arm 158 to the second steering knuckle 148. The first control arm 156 may be supported by the first bracket 162, such as to be hingingly coupled to the first bracket 162. Likewise, the second control arm 158 may be supported by the second bracket 164, such as to be hingingly coupled to the second bracket 164. Described herein, hingingly coupled may refer to coupling a component such as to swivel or rotate about a feature of another component. For example, the first control arm 156 may be hingingly coupled such as to rotate around a bushing or a bushing assembly of the first bracket 162. Likewise, the second control arm 158 may be hingingly coupled such as to rotate around a bushing or a bushing assembly of the second bracket 164.

The transmission 108 may physically couple to an axle of the vehicle, such as via mounting. The transmission 108 may be a gearbox or include a gearbox. Alternatively, the transmission 108 may be an axle transmission or a trans axle transmission. The transmission 108 may physically couple to an axle of the vehicle, such as via mounting. In some embodiments, additionally or alternatively, the transmission 108 may be a first transmission, and the vehicle 100 may have a second transmission. A second transmission or additional transmissions may be arranged to physically couple an axle of the vehicle 100, such as the axle of the axle assembly 112. Additionally, the second transmission may be drivingly coupled and output torque to the axle assembly 112. Additionally or alternatively, a second transmission or another transmission may be arranged to drivingly couple and output torque to another axle besides the axle of the axle assembly 112.

It is to be appreciated, that for another example of vehicle 100, there may be one or more transmissions that may not output to a drive shaft, such as driveshaft 122. For example, one or more of the transmissions may output directly to an axle shaft and/or a wheel, such as an axle shaft of the axle assembly 112 and/or a wheel of wheels 114. Transmissions of this example may be referred to herein as wheel side transmissions. A mover may output torque to the wheel side transmission, where rotary power flows from the mover to the transmission.

Adjustment of the drivetrain 103 between the various modes of operation as well as control of operations within each mode may be executed based on a vehicle control system 174, including a controller 176. Controller 176 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 176 may be a powertrain control module (PCM).

Controller 176 may receive various signals from sensors 178 coupled to various regions of vehicle 100. For example, the sensors 178 may include sensors at the prime mover 106 or another mover to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the set of wheels 114 etc. Upon receiving the signals from the various sensors 178 of FIG. 1, controller 176 processes the received signals, and employs various actuators 180 of vehicle 100 to adjust drivetrain operations based on the received signals and instructions stored on the memory of controller 176. For example, controller 176 may receive an indication of depression of the brake pedal, signaling a desire for decreased vehicle speed. Vehicle braking may be directly proportional to accelerator pedal position, for example, degree of depression. For another example, controller 176 may receive an indication of depression of the accelerator pedal, signaling a desire for increased vehicle speed. Vehicle acceleration may be directly proportional to accelerator pedal position, for example, degree of depression. For another example, controller 176 may receive indication of a rotation or change in position of a steering input device signaling a desire for turning of the vehicle. For this example, the steering input device may be a steering wheel, alternatively the steering input device may be a lever. Vehicle angle of turn may be directly proportional to steering input device position, for example, degree of turn or degree of depression. In response, the controller 176 may command operations, such as shifting gear modes of the transmission 108. Alternatively, the gear modes of the transmission 108 may be shifted manually, such as if the transmission 108 is a manual transmission.

A set of reference axes 201 are provided for comparison between views shown in FIGS. 2-7. The reference axes 201 indicate a y-axis, an x-axis, and a z-axis. In one example, the z-axis may be parallel with a direction of gravity, and the x-y plane may be parallel with a horizontal plane that an axle assembly 212 of FIG. 2 may rest upon. In another example, the z-axis may be parallel with a direction of gravity, and the x-y plane may be parallel with a horizontal plane that a bracket assembly 214 of FIG. 5 may rest upon. In another example, the z-axis may be parallel with a direction of gravity, and the x-y plane may be parallel with a horizontal plane that a forged body 232 of FIG. 6 may rest upon. In another example, the z-axis may be parallel with a direction of gravity, and the x-y plane may be parallel with a horizontal plane that a stamped plate 234 of FIG. 7 may rest upon. A circle may represent an axis of the reference axes 201 that is normal to a view. A circle may represent an axis of the reference axes 201 that is normal to a view. A filled circle may represent an arrow and axis facing toward, or positive to, a view. An unfilled circle may represent an arrow and an axis facing away, or negative to, a view.

Turning to FIG. 2, it shows a first view 200 of the bracket assembly 214 physically coupled to the axle assembly 212. More specifically, the bracket assembly 214 is rigidly coupled to the axle housing 218. The bracket assembly 214 is a suspension bracket assembly and may be an example configuration of the first bracket 162 and second bracket 164 of FIG. 1. The first view 200 is a side view. The axle assembly 212 is an underslung axle assembly including an underslung axle. The axle assembly 212 may be an example configuration of the axle assembly 112 of FIG. 1.

The bracket assembly 214 may support an arm 216. For a first example, the arm 216 may be a lower control arm. The arm 216 may therein be an example configuration of the first control arm 156 and/or the second control arm 158 of FIG. 1. Likewise, the bracket assembly 214 may therein be an example configuration of or include the first bracket 162 and/or second bracket 164 of FIG. 1. For another example, the arm 216 may be another arm that may shiftingly couple or pivotably coupled to a lower control arm, where the arm 216 may shift or pivot the control arm, respectively.

The arm 220 may include a body 222 with a first hole 224. The first hole 224 may be a fit. The first hole 224 may support and house a bushing assembly 226. The first hole 224 may extend through the body 222. The bushing assembly 226 may be housed by the first hole 224. The first hole 224 is centered, such that the axis 230 is concentric with the first hole 224. Said in another way, the first hole 224 is positioned radially around the axis 230. The axis 230 may be a rotational axis for the arm 220, wherein the arm may pivot about the axis 230. The bushing assembly 226 may be centered around the axis 230, such that the axis 230 may be concentric with the bushing assembly 226. Said in another way, the bushing assembly 226 may be positioned radially around the axis 230. The bushing assembly 226 may include one or more bushings that the arm 220 may spin around. The body 222 may be supported and hingingly coupled to the bracket assembly 214 via the one or more bushings of the bushing assembly 226. The bushing assembly 226 is of a Bar-Pin style configuration. The bushing assembly 226 may therein be assembled and fastened to the bracket assembly 214 via a Bar-Pin bushing method and at least two fasteners. Alternatively, a bearing assembly may support the arm 220 and be housed by the first hole 224 in place of the bushing assembly 226. The bearing assembly may comprise one or more of a plurality of bearings. The bearing assembly may be centered around the axis 230, such that the axis 230 is concentric to the bearing assembly.

The bracket assembly 214 comprises at least a first component and a second component. The bracket assembly 214 also comprises one or more of a plurality of bushing pins 240. The first component is a forged body 232, where the forged body 232 is a structure shaped via forging used for mounting. More specifically, the forged body 232 is a forged bracket comprising a U-shaped portion 236. The second component is a structure shaped via stamping. More specifically the second component is a stamped plate 234.

The forged body 232 may physically couple to the axle housing 218. The forged body 232 and the stamped plate 234 may support and couple to the bushing assembly 226. More specifically, the stamped plate 234 may provide clamping to one or more of the bushing pins 240 against the forged body 232, rigidly coupling one or more of the bushing pins 240 to the bracket assembly 214.

For example, the bushing pins 240 may be retained between the forged body 232 and the stamped plate 234. In some examples, there may be a pair of bushing pins 240. The bushing pins 240 may extend through a fit of the bushing assembly 226. The bushing pins 240 may be concentric to the bushing assembly 226. The bushing pins 240 may support the bushing assembly 226, and the bushing pins 240 may fix the bushing assembly to the bracket assembly 214. A plurality of first fastening systems 242 and a plurality of second fastening systems 244 may fasten the forged body 232 to the stamped plate 234. Additionally, the second fastening systems 244 may fasten and retain the bushing pins 240 between the forged body 232 and the stamped plate 234. The second fastening systems 244 may also fasten the stamped plate 234 to the forged body 232. Tightening the first and second fastening systems 242, 244 may increase the clamping of the stamped plate 234 to the bushing pins 240 against the forged body 232. Alternatively, a single bushing pin may be used in place of the bushing pins 240 to support the bushing assembly 226.

For another example, the bearing assembly used in place of the bushing assembly 226 may include the bushing pins 240. The bushing pins 240 may support the bearing assembly used in place of the bushing assembly 226 in the way the bushing pins 240 support the bushing assembly 226. Likewise, the bushing pins 240 may be fastened to and clamped by the bracket assembly 214 when supporting the bearing assembly in the same manner as to when supporting the bushing assembly 226.

The forged body 232 may be more rigid compared to the stamped plate 234. Likewise, the stamped plate 234 may change shape elastically, and change shape elastically more so compared to the forged body 232. For example, the stamped plate 234 may experience elastic compression, elastic expansion, and/or elastic bending from forces to the bracket assembly 214. The stamped plate 234 thus has a degree of stiffness allowing for elastic shape change of the stamped component above a first threshold of strain and below a second threshold of strain. The stamped plate 234 may therein provide give to the bracket assembly 214, allowing the bracket assembly 214 to expand in response to mechanical forces.

The forged body 232 includes a U-shaped portion 236. The U-shaped portion 236 may curve around and contact the axle housing 218. The U-shaped portion 236 may physically couple the axle housing 218. Said in another way, the U-shaped portion 236 may rigidly couple the forged body 232 to the axle housing 218. More specifically, the U-shaped portion 236 may curve around, contact, and physically couple to a surface 228 of the axle housing 218. The surface 228 is an outer surface that curves with the axle housing 218. The surface 228 may have a radial curvature and may be partially cylindrical in shape. For an example, the U-shaped portion 236 may be configured to be welded to the axle housing 218. A weld may be created between the U-shaped portion 236 and the surface 228.

The U-shaped portion 236 may include a second hole 238. The second hole 238 is an opening and may be a window via which welding may be facilitated. For example, the U-shaped portion 236 may be welded to the bracket assembly 214 via the second hole 238. The second hole 238 may extend through the material of the U-shaped portion 236 from an outer surface 239. The outer surface 239 is an outer surface that curves with the U-shaped portion and connects to other features of the forged body 232. The outer surface 239 may face outward from the forged body 232.

The first fastening systems 242 may include a plurality of first fasteners 246 and a plurality of first washers 248. The first fasteners 246 may be bolts. Each of the first fasteners 246 may extend through a first opening of the stamped plate 234 and a second opening of the forged body 232. The first opening and the second opening of the stamped plate 234 and the forged body 232 may be centered on a common axis. The openings of the forged body 232 and the stamped plate 234 that the first fasteners 246 may be fit to and extend through may be holes, with the openings of the stamped plate 234 being through-holes. The openings of the forged body 232 and the stamped plate 234 for the first fasteners 246 may be centered around a common axis when aligned. When the openings the forged body 232 and the stamped plate 234 are aligned, the first fasteners may be extended through the openings. A washer of the first washers 248 may be disposed between the stamped plate 234 and a head of each of the first fasteners 246. The first fasteners 246 may extend through openings, such as holes, of the first washers 248.

The second fastening systems 244 may include a plurality of second fasteners 252, and a plurality of second washers 254, and a plurality of nuts 256. The second fasteners 252 may be bolts. Each of the second fasteners 252 may extend through an opening of the stamped plate 234, an opening of a body 258 of the bushing pins 240, and an opening the forged body 232. The openings of the forged body 232, the stamped plate 234, and the body 258 the first fasteners 246 may be fit to and extend through may be holes, with the openings of the stamped plate 234 and the body 258 being through-holes. The openings of the forged body 232, the stamped plate 234, and the body 258 for the second fasteners 252 may be centered around a common axis when aligned. When the openings of the forged body 232, the stamped plate 234, and the body 258 are aligned, the second fasteners 252 may be extended through the openings. A washer of the second washers 254 may be disposed between the stamped plate 234 and a head of each of the second fasteners 252. The second fasteners 252 may extend through openings, such as holes, of the second washers 254. The body 258 may be sandwiched between the first component and the second component, and retained via the second fastening systems 244. Each bushing pin of the bushing pins 240 may have a body, such as the body 258, that may be sandwiched and retained between the forged body 232 and the stamped plate 234. The bodies of the bushing pins 240, including body 258, may be fastened to and retained between the forged body 232 and the stamped plate 234 via the second fastening systems 244. Tightening of one or more of the nuts 256 may increase the clamping of the stamped plate 234 to the body 258 and other bodies of the bushing pins 240 against the forged body 232.

For another example, where the single bushing pin is used in place of the bushing pins 240, the bushing pin may rigidly couple or comprise the body 258. Likewise, the bushing pin may rigidly couple or comprise a second body, where the second body is at the opposite end of the bushing pin from the body 258. The body 258 and the second body may be sandwiched and retained between the forged body 232 and the stamped plate 234. The second fastening systems 244 may fasten and retain the body 258 and the second body to the forged body 232 and the stamped plate 234. The bushing pin may be rigidly coupled to bracket assembly 214, therein.

The first washers 248 and the second washers 254 may be thin plates that are rounded in shape. For example, the first washers 248 and the second washers 254 may have circular perimeters and be disk shaped.

For other examples, the first fastening systems 242 and/or the second fastening systems 244 may not include the first washers 248 and/or the second washers 254, respectively. For these examples, the heads of first fasteners 246 and the second fasteners 252 may abut and press surfaces of the stamped plate 234.

The stamped plate 234 comprises a set of appendages on opposite sides of a support beam 260. The set of appendages may be at least a pair of appendages. Below the support beam 260 and between the appendages is a gap 262. The gap 262 may be between opposite sides of the stamped plate 234 and below the support beam 260. The appendages include an appendage 264. The appendage 264 may be a tab. The appendage 264 has a surface 266. The surface 266 may be substantially flat. The support beam 260 may be connected to the appendage 264, extending at a first angle 268 from the appendage 264. More specifically, the support beam 260 may be connected to the surface 266, extending at a first angle 268 from the surface 266. The appendage 264 may include an end 270. The end 270 may be a member of the appendage 264 connecting to the surface 266. The end 270 may extend at a second angle 272 from the surface 266.

The support beam 260 and the appendage 264 may be positioned about the arm 216. Likewise, the gap 262 may surround the arm 216. The gap 262 may therein be a slot for the arm 216 to pivot about the bushing assembly 226. The support beam 260 may be positioned above the arm 216. The appendage 264 may curve from the support beam 260 to outboard of the arm 216. Outboard and inboard may be relative to the arm 216, with an inboard direction facing inward toward the arm 216 and an outboard direction facing outward away from the arm 216. Additionally or alternatively, outboard and inboard may be relative to the stamped plate 234, with the inboard direction facing inward toward the gap 262 and the outboard direction facing outward from the outer edges of the stamped plate 234. For example, the arm 216 may be positioned inboard of the stamped plate 234. The outboard and inboard directions may be represented by a plurality of first arrows 282 and a plurality of second arrows 284, respectively.

The appendage 264 may abut the body 258. More specifically, the appendage 264 may clamp against the body 258. The appendage 264 may be fastened against the body 258 by a fastening system of the second fastening systems 244. Tightening of one or more of the nuts 256 and/or one or more of the second fasteners 252 may increase clamping of the first appendage 264 against the body 258.

Turning to FIG. 3, it shows a second view 300 of the axle assembly 212. The second view 300 is a side view. The second view 300 shows the bracket assembly 214 physically coupled to the axle assembly 212. The second view 300 shows the arm 220 removed from being supported by and hingingly coupled to the bracket assembly 214. Likewise, the second view 300 shows the bushing pins 240 and the second fastening systems 244 removed from the bracket assembly 214.

The second view 300 shows the axle housing 218 may be centered around an axis 310. The axle housing 218 is centered, such that the axis 310 is concentric to the axle housing 218. Said in another way, the axle housing 218 may be positioned radially around the axis 310. The axis 310 may be lateral with respect to a longitudinal axis of a vehicle housing the axle assembly 212, such as the longitudinal axis 130 of the vehicle 100 shown in FIG. 1. The axis 310 may be a horizontal axis and a lateral axis for the axle assembly 212 and the bracket assembly 214. Likewise, the axis 310 may be a rotational and central axis for the axle shafts housed by the axle housing 218.

The second view 300 shows that the axle assembly 212 may include a pair of the first fastening systems 242 of FIG. 2, including a first fastening system 242a and a second first fastening system 242b. The first fastening system 242a may extend through the appendage 264 to fasten to the forged body 232. The second first fastening system 242b may extend through a second appendage 324 to fasten to the forged body 232. The appendage 264 may be referred to herein as the first appendage 264. The stamped plate 234 comprises the second appendage 324. The second appendage 324 is positioned opposite the gap 262 from the first appendage 264. The second appendage 324 may have a second surface 326 and a second end 360. The support beam 260 may be connected to the second appendage 324. Likewise, the support beam 260 may extend at the first angle 268 from the second appendage 324. More specifically, the support beam 260 may be connected to the second surface 326, and may extend at the first angle 268 from the second surface 326. Likewise, the second end 360 may be connected to the second surface 326, and may extend at the second angle 272 from the second surface 326. The second end 360 may be a member of the second appendage 324 connecting to the second surface 326. The second end 360 may extend at a second angle 272 from the second surface 326. The second appendage 324 may be symmetrical and mirrored with respect to the first appendage 264. The second end 360 may therein be symmetrical to the end 270.

The second hole 238 has a plurality of rounded edges connected to the outer surface 239. The second hole 238 may have an edge 328. The edge 328 may be lateral and linear in length and may be rounded. The edge 328 may be connected to the outer surface 239. The second hole 238 may have edges that are connected to, continuous with, and curve with a parabolic shape toward the edge 328. The edges that may be connected to and be continuous with the edge 328 may be rounded.

The second component has a plurality of curved edges and linear edges that may define the shape of the first appendage 264, the second appendage 324, and the support beam 260. Likewise, the stamped plate 234 has a plurality of curved edges and linear edges that may define the shape of the gap 262. For an example configuration, the stamped plate 234 comprises and is shaped by a first curved edge 336, a second curved edge 338, a third curved edge 340, and a fourth curved edge 342. Likewise, the stamped plate 234 comprises and is shaped by a first straight edge 344, a second straight edge 346, a third straight edge 348, a fourth straight edge 350, a fifth straight edge 352, and a sixth straight edge 354. The beam 260 may comprise the first curved edge 336, the second curved edge 338, the third curved edge 340, and the fourth curved edge 342. Additionally, the beam 260 may comprise the first straight edge 344 and the second straight edge 346. The first appendage 264 may comprise the third straight edge 348 and the fifth straight edge 352. The second appendage 324 may comprise the fourth straight edge 350 and the sixth straight edge 354.

The first curved edge 336 and the third curved edge 340 connect the first appendage 264 and the beam 260. Likewise, the second curved edge 338 and the fourth curved edge 342 connect the second appendage 324 and the beam 260. The first curved edge 336 and the second curved edge 338 are outer edges that face in an outboard direction from the stamped plate 234. The third curved edge 340 and the fourth curved edge 342 are inner edges that face in an inboard direction from the stamped plate 234. The third curved edge 340 and the fourth curved edge 342 face and define the shape of the gap 262.

The first and second straight edges 344, 346 are parallel and may have lengths that are lateral with respect to the axis 310. The third straight edge 348, the fourth straight edge 350, the fifth straight edge 352, and the sixth straight edge 354 are parallel and have lengths that are vertical. The third and fourth straight edges 348, 350 face in an outboard direction from the stamped plate 234. The fifth and sixth straight edges 352, 354 face in an inboard direction from the stamped plate 234. The first curved edge 336 may curve between and connect to the first straight edge 344 and the third straight edge 348. The first curved edge 336 may be continuous with the first straight edge 344 and the third straight edge 348. The second curved edge 338 may curve between and connect to the first straight edge 344 and the fourth straight edge 350. The second curved edge 338 may be continuous with the first straight edge 344 and the fourth straight edge 350. The third curved edge 340 may curve between and connect the second straight edge 346 and the fifth straight edge 352. The third curved edge 340 may be continuous with the second straight edge 346 and the fifth straight edge 352. The fourth curved edge 342 may curve between and connect the second straight edge 346 and the sixth straight edge 354. The fourth curved edge 342 may be continuous with the second straight edge 346 and the sixth straight edge 354.

The stamped plate 234 may have a plurality of third openings. The third openings are openings, such as throughholes, that extend through the material of the stamped plate 234. Each of the third openings may receive a fastener of the second fasteners 252. The first appendage 264 and the second appendage 324 may each have openings of the third openings. For example, the first appendage 264 comprises a first third opening 362a, and the second appendage 324 comprises a second third opening 362b.

The second appendage 324 may abut a second body of the bushing pins 240 of FIG. 2, where the second body is at the opposite side of the bushing pins 240 from the body 258 of FIG. 2. More specifically, the second appendage 324 may clamp against second body. The second appendage 324 may be fastened and clamped against the second body by a fastening system of the second fastening systems 244. Tightening of one or more of the nuts 256 of FIG. 2 and/or one or more of the second fasteners 252 of FIG. 2, may increase clamping of the second appendage 324 to the second body.

Turning to FIG. 4, it shows a third view 400 of an axle assembly 212. The third view 400 is a side view. The third view 400 is taken on a view plane opposite to the second view 300 of FIG. 3.

The third view 400 shows the second hole 238 may be directly continuous with and connected via edges and surfaces to a second gap 430. The second gap 430 may extend downward from the second hole 238. The second gap 430 may be outward from the axle housing 218 and the axis 310. The second gap 430 is between a first leg 432 and a second leg 434 of the forged body 232. Said in another way, the first leg 432 and second leg 434 are on opposite sides of the second gap 430. The first leg 432 and the second leg 434 may extend downward from the U-shaped portion 236. Likewise, the first leg 432 and the second leg 434 may extend outward from the axle housing 218 and the axis 310. The first leg 432 may comprise a first surface 436, and the second leg may comprise the second surface 438. The first surface 436 and the second surface 438 may be flat with rounded edges and corners. The arm 216 of FIG. 2 may be surrounded by the second gap 430. Likewise, the first leg 432 and the second leg 434 may be outboard of the arm 216.

A plurality of rounded edges including a first rounded edge 442, a second rounded edge 444, and a third rounded edge 446 of the U-shaped portion 236 are positioned around and shape the second hole 238. The rounded edges 442, 444, 446 are smooth and continuous with the outer surface 239 of FIGS. 2-3 and a second outer surface 440. The outer surface 239 may be referred to herein as the first outer surface 239. The first rounded edge 442 and the third rounded edge 446 may curve upward toward and connect with the second rounded edge 444. The second rounded edge may have a length parallel with the axis 310, and therein may be lateral and horizontal. The first rounded edge 442 and the third rounded edge 446 may curve upward from the first leg 432 and the second leg 434, respectively. The first and third rounded edges 442, 446 may start to extend upward linearly and become increasingly parabolic in shape as they curve toward and meet with the second rounded edge 444. The first rounded edge 442 and the third rounded edge 446 may be symmetrical and mirrored on opposite sides of the second hole 238.

The second outer surface 440 is an outer surface of the U-shaped portion 236. The second outer surface 440 may face outward from the forged body 232. The second outer surface 440 may be curved, curving with the curvature of the U-shaped portion 236. The second outer surface 440 may be continuous with and connected to the edges of the second hole 238. The first outer surface 239 and the second outer surface 440 may be symmetrical and mirrored opposite to one another across the second hole 238 and the axis 310. Portions of the first outer surface 239 and the second outer surface 440 may be connected. Additionally, the connected portions of the first outer surface 239 and the second outer surface 440 may be continuous.

The forged body 232 may have a plurality of fourth openings, including the first fourth opening 452a and a second fourth opening 452b. The fourth openings are openings, such as through-holes, that extend through the material of the forged body 232. The first leg 432 and the second leg 434 may each have fourth openings. For example, the first leg 432 comprises the first fourth opening 452a and the second leg 434 comprises the second fourth opening 452b. The fourth openings, including the fourth openings 452a, 452b, may each receive a fastener of the second fasteners 252. Said in another way, the second fasteners 252 may extend through and fasten to the fourth openings, including the fourth openings 452a, 452b.

The third openings of FIG. 3 and the fourth openings may be coaxial, such that pairs of the third openings and fourth openings are centered on a common axis. For example, the bracket assembly 214 may be aligned with an axis 462 and an axis 464. More specifically, the first third opening 362a of FIG. 3. and the first fourth opening 452a have coaxial centerlines when the bracket assembly 214 is aligned with the axis 462. Likewise, the second third opening 362b of FIG. 3 and the second fourth opening 452b may have coaxial centerlines when the bracket assembly 214 is aligned with the axis 464. Said in another way, the first third opening 362a and the first fourth opening 452a may be centered around axis 462, where the axis 462 is concentric to the first third opening 362a and the first fourth opening 452a. Likewise, the second third opening 362b and the second fourth opening 452b may be centered around axis 464, where the axis 464 is concentric to the second third opening 362b and the second fourth opening 452b.

Turning to FIG. 5 it shows a fourth view 500 of the bracket assembly 214. The fourth view 500 is a side view. The fourth view 500 shows the bracket assembly 214 separate from the axle assembly 212 of FIG. 2.

The bracket assembly 214 may be aligned with an axis 510, where the axis 510 may be a line of symmetry for the U-shaped portion 236. Said in another way, a plane parallel with a plane created by the x and z axes of the reference axes 201 may divide the U-shaped portion 236 into approximately symmetrical halves. The axis 510 may be co-axial with the axis 310 of FIG. 3.

The bracket assembly 214 may be aligned with an axis 522 and an axis 524 axis. More specifically, the first fastening system 242a may be centered around the axis 522 and the second first fastening system 242b may be centered radially around the axis 524. Each of the components comprising the first fastening system 242a, including a fastener of the first fasteners 246, may be centered around the axis 522. Likewise, each of the components comprising the second first fastening system 242b, including a fastener of the first fasteners 246, may be centered radially around the axis 524. The axis 522 and axis 524 may be parallel. The axis 522 may be parallel with the axis 462. The axis 524 may be parallel with the axis 464. The axis 462, the axis 464, the axis 522, and the axis 524 may be longitudinal with respect to a longitudinal axis of a vehicle housing the bracket assembly 214, such as the longitudinal axis 130 of the vehicle 100 shown in FIG. 1.

The U-shaped portion 236 comprises a first curved wall 532 and a second curved wall 534. The first curved wall 532 is opposite the axis 510 from the second curved wall 534. The first curved wall 532 may comprise the first outer surface 239. The first outer surface 239 may curve with the curvature of and may shape the first curved wall 532. Likewise, second curved wall 534 may comprise the second outer surface 440 of FIG. 4. The second outer surface 440 is opposite the axis 510 from the first outer surface 239. The second outer surface 440 may curve with the curvature of and may shape the second curved wall 534.

The U-shaped portion 236 comprises a first valley 536 and a second valley 538. The first valley 536 and the second valley 538 are on opposite sides of and separated by the second hole 238. The first valley 536 and the second valley 538 are both connected to the first curved wall 532 and the second curved wall 534. Likewise, the first valley 536 and the second valley 538 may have surfaces continuous with inner surfaces of the first curved wall 532 and the second curved wall 534. For example, an inner surface 548 of the second curved wall 534 may comprise or be continuous with the surfaces of the first valley 536 and the second valley 538. The inner surface 548 may curve with the curvature of and may shape the second curved wall 534.

The inner surface 548 may be a first inner surface for the U-shaped portion 236, and the first curved wall 532 may have a second inner surface facing inward from the forged body 232 and toward the axis 510. The second inner surface may curve with the curvature of and may shape the first curved wall 532. The second inner surface may face and be opposite the axis 510 from the inner surface 548. The second inner surface of the first curved wall 532 may comprise or be continuous with the surfaces of the first valley 536 and the second valley 538.

The first curved wall 532 and the second curved wall 534 may be symmetrical, with the first curved wall 532 mirroring the second curved wall 534 across the axis 510. Likewise, the first valley 536 and the second valley 538 may be symmetrical, with the first valley 536 mirroring the second valley 538 across the second hole 238.

The inner surface 548, the second inner surface, and the surfaces of the first valley 536 and second valley 538 may be welded to an axle housing, such as the axle housing 218 of FIG. 2. The second hole 238 may allow welding at the inner surface 548, the second inner surface, and the surfaces of the first valley 536 and second valley 538.

A first block 542 and a second block 544 are connected to the U-shaped portion 236. The first block 542 and the second block 544 may be below the U-shaped portion 236. The body of the first block 542 may be below the first valley 536, and the first valley 536 may depress into the first block 542. Likewise, the body of the second block 544 may be below the second valley 538, and the second valley 538 may depress into the second block 544. The first leg 432 may be connected to and extend from the first block 542. The first leg 432 may extend downward from the first block 542. Likewise, the second leg 434 may be connected to and extend from the second block 544. The second leg 434 may extend downward from the second block 544. The first fastening system 242a and the second first fastening system 242b may fasten the stamped plate 234 to the first block 542 and the second block 544, respectively. More specifically, the first fastening system 242a may fasten the first appendage 264 to the first block 542 via a fastener of the first fasteners 246. Likewise, the second first fastening system 242b may fasten the second appendage 324 to the second block 544 via a fastener of the first fasteners 246.

The first block 542 and the second block 544 may be supportive blocks, providing rigidity for U-shaped portion 236. More specifically, the first block 542 and the second block 544 may support loads placed on and provide rigidity for the first valley 536 and the second valley 538. Mechanical loads from an axle assembly the U-shaped portion 236 physically couples to may be directed from the first curved wall 532, the second curved wall 534, the first valley 536, and the second valley 538 into the first block 542 and the second block 544. Mechanical loads from the first block 542 may be directed into the first leg 432. Mechanical loads from the second block 544 may be directed into the second leg 434.

Turning to FIG. 6 it shows a fifth view 600 of the forged body 232 of the bracket assembly 214 of FIGS. 2-5. As described previously, the forged body 232 may be fastened to the stamped plate 234 from FIGS. 2-5, and the stamped plate 234 may clamp the bushing pins 240 of FIG. 2 to the forged body 232. More specifically, the fifth view 600 shows the forged body 232 separated and de-coupled from the stamped plate 234 and other components/features of the bracket assembly 214 of FIG. 2. The fifth view 600 is a side view.

The forged body 232 may comprise a plurality of fifth openings, including a first fifth opening 632a and a second fifth opening 632b. The fifth openings are openings that extend into the material of the forged body 232. The first block 542 and the second block 544 may each have fourth openings. For example, the first block 542 comprises the first fifth opening 632a, and the second block 544 comprises the second fifth opening 632b. The first fifth opening 632a may be centered around the axis 522. The second fifth opening 632b may be centered around the axis 524.

The first fastening systems 242 of FIGS. 2-5 may fasten to the first fifth opening 632a and the second fifth opening 632b. The first fastening system 242a of FIGS. 3-5 may fasten to the first fifth opening 632a. The second first fastening system 242b of FIGS. 3-5 may fasten to the second fifth opening 632b. The fifth openings, including the fifth openings 632a, 632b, may each receive and fasten to a fastener of the second fasteners 252 of FIGS. 2-5. Said in another way, the second fasteners 252 may extend through and fasten to the fifth openings, including the fifth openings 632a, 632b. The fifth openings 632a, 632b may each have fastening features that may mate with other fastening features of the first fasteners 246, fastening the first fasteners 246 to the fifth openings 632a, 632b. For example, the fifth openings 632a, 632b may have female threading that may mate with male threading of the first fasteners 246.

The first block 542 may include a first surface 642. A second block 544 may include a second surface 644. The stamped plate 234 may be fastened to and abut the forged body 232 at a first surface 642 and a second surface 644.

The first leg 432 may include a third surface 652. The second leg 434 may include a fourth surface 654. Bodies of the bushing pins 240 of FIG. 2 may abut the third surface 652 and the fourth surface 654. At least a body of the bushing pins 240 may be retained between the third surface 652 and the stamped plate 234. Likewise, at least another body of the bushing pins 240 may be retained between the fourth surface 654 and the stamped plate 234. For example, the body 258 of FIG. 2 may be a first body of a first bushing pin and another body may be a second body of a second bushing pin, the first and the second bushing pins are bushing pins of the bushing pins 240. The body 258 may abut and be retained against the third surface 652 via the first fastening systems 242 and the stamped plate 234. More specifically, the first appendage 264 of FIG. 2 may clamp the first body against the third surface 652. Likewise, the other body of the bushing pins 240 of may abut and be retained against the fourth surface 654 via the first fastening systems 242 and the stamped plate 234. More specifically, the second appendage 324 of FIG. 3 may clamp the other body against the fourth surface 654.

Turning to FIG. 7 it shows a sixth view 700 of the stamped plate 234 of the bracket assembly 214 that may be fastened to the forged body 232 from FIGS. 2-5. As described previously, the stamped plate 234 may be fastened to the forged body 232 from FIGS. 2-5, and the stamped plate 234 may clamp the bushing pins 240 of FIG. 2 to the forged body 232. More specifically, the sixth view 700 shows the stamped plate 234 separated and de-coupled from the forged body 232 and other components/features of the bracket assembly 214 of FIGS. 2-5. The sixth view 700 is a side view.

The stamped plate 234 may comprise a plurality of sixth openings, including a first sixth opening 732a and a second sixth opening 732b. The sixth openings may be through-holes, that extend through the material of the stamped plate 234. The first appendage 264 and the second appendage 324 may each have one or more openings of the sixth openings. For example, the first appendage 264 comprises the first sixth opening 732a, and the second appendage 324 comprises the second sixth opening 732b. The first sixth opening 732a may be centered around the axis 522. The second sixth opening 732b may be centered around the axis 524. The first fifth opening 632a of FIG. 6 and the first sixth opening 732a may be co-axial, sharing axis 522 as a common axis to be centered around. Likewise, the second fifth opening 632b of FIG. 6 and the second sixth opening 732b may be co-axial, sharing the axis 524 as a common axis to be centered around. The forged body 232 and the stamped plate 234 may be aligned such that the first fifth opening 632a and first sixth opening 732a are centered around the axis 522 and the second fifth opening 632b and the second sixth opening 732b are centered around the axis 524.

The sixth openings, including the sixth openings 732a, 732b, may each receive a fastener of the first fasteners 246 of FIGS. 2-5. Said in another way, the first fasteners 246 may extend through the sixth openings 732a, 732b. The first fastening system 242a of FIGS. 2-5 may fasten the stamped plate 234 to the forged body 232 via the first sixth opening 732a. More specifically, a fastener of the first fasteners 246 may extend through the first sixth opening 732a and fasten the first appendage 264 to the first surface 642 of FIG. 6. The second first fastening system 242b of FIGS. 2-5 may fasten the stamped plate 234 to the forged body 232 via the second sixth opening 732b. More specifically, a fastener of the first fasteners 246 of FIG. 2 may extend through the second sixth opening 732b and fasten the first appendage 264 to the second surface 644 of FIG. 6.

In this way, the disclosed system provides for a system of a bracket assembly that may be joined to a housing of an axle assembly and support an arm, such that the arm is hingingly coupled to the bracket via a plurality bushing pins. More specifically, the bracket assembly may be welded to an axle shaft housing and support a lower control arm, where the lower control arm is hingingly coupled to the bracket via the bushing pins. The bracket assembly comprises a forged bracket and a stamped plate. The forged bracket includes a U-shaped portion configured to be welded to the axle shaft housing. The U-shaped portion includes a hole. The hole is a window that facilitates welding of the U-shaped portion. The stamped plate includes a first appendage and a second appendage that may be connected via a beam. The first appendage and the second appendage may be tabs, and the first appendage and the second appendage may be fastened to the forged bracket via at least a first set of first fasteners. The first appendage and the second appendage may each abut a body of a bushing pin of the bushing pins, such that the bushing pins may be retained between the forged bracket and the stamped plate. A first leg and a second leg of the forged body may each abut a body of a bushing pin of the bushing pins. A second set of second fasteners may fasten the bushing pins via their respective bodies to the first appendage and the second appendage. The second fasteners may also fasten the bodies of the bushing pins to the first leg and the second leg. Likewise, the second fasteners may fasten the first appendage to the first leg and the second appendage to the second leg.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A suspension bracket assembly comprising:
a forged body;
a stamped plate; and
a pair of bushing pins, the forged body comprising a U-shaped portion configured to be welded to an axle housing, the stamped plate comprising a plurality of appendages configured to be fastened to the forged body via a first set of first fasteners; and the pair of bushing pins configured to be interposed between the stamped plate and the forged body, wherein the pair of bushing pins is fastened via a second set of second fasteners.

2. The suspension bracket assembly of claim 1, wherein the U-shaped portion comprises a hole, and wherein the hole is configured to facilitate welding of the U-shaped portion to the axle housing.

3. The suspension bracket assembly of claim 2, wherein a gap extends downward from the U-shaped portion, the gap is directly continuous with the hole.

4. The suspension bracket assembly of claim 3, wherein a first block and a second block extend downward from the U-shaped portion, the first block and the second block are opposite the gap, the first block and the second block each have first holes, and the first fasteners extend through the first holes.

5. The suspension bracket assembly of claim 4, wherein the first block comprises a first surface and the second block comprises a second surface, and wherein a first appendage and a second appendage of the appendages are configured to contact and press against the first surface and the second surface, respectively.

6. The suspension bracket assembly of claim 4, wherein a first leg extends downward from the first block and a second leg extends downward from the second block, the first leg and the second leg each having second holes, and wherein the second fasteners extend through the second holes.

7. The suspension bracket assembly of claim 6, wherein the first leg comprises a first surface and the second leg comprises a second surface, and a first bushing pin of the pair of bushing pins abuts the first surface and a second bushing pin of the pair of bushing pins abuts the second surface.

8. The suspension bracket assembly of claim 1, wherein the stamped plate is a degree of stiffness allowing for elastic shape change of the stamped plate above a first threshold of strain and below a second threshold of strain.

9. The suspension bracket assembly of claim 1, wherein each of the pair of bushing pins is disposed between an appendage of the appendages, and the second fasteners extend through the appendages.

10. The suspension bracket assembly of claim 9, wherein the appendages are tabs configured to fasten to and clamp to the pair of bushing pins.

11. The suspension bracket assembly of claim 9, wherein the pair of bushing pins is received by and extends through a control arm, the control arm hingingly coupled to the pair of bushing pins.

12. The suspension bracket assembly of claim 11, wherein the pair of bushing pins each are of a Bar-Pin style configuration.

13. The suspension bracket assembly of claim 11, wherein a gap between the appendages surrounds the control arm.

14. A forged body of a suspension bracket assembly comprising:
   a U-shaped portion;
   a first block;
   a second block;
   a first leg; and
   a second leg,
   the U-shaped portion comprising a hole, the first block and the second block extending downward from the U-shaped portion, the first leg extending from the first block, the second leg extending from the second block, the first block and the first leg opposite from the second block and the second leg across the hole, wherein the U-shaped portion is configured to be welded to an axle housing, and wherein a stamped plate is fastened to and abuts the first block and the second block via a set of fasteners, the first block and the second block each having holes the fasteners extend through.

15. The forged body of claim 14, wherein a plurality of bushing pins is fastened to the forged body by a set of fasteners, a first bushing pin of the plurality of bushing pins is fastened to the first leg, and a second bushing pin of the plurality of bushing pins is fastened to the second leg, the first leg and the second leg having holes the fasteners extend through.

16. The forged body of claim 15, wherein the first leg includes a first surface and the second leg includes a second surface, a first body of the first bushing pin is clamped to the first surface, and a second body of the second bushing pin is clamped to the second surface.

17. A stamped plate of a suspension bracket assembly comprising:
   a beam;
   a first appendage;
   a second appendage; and
   a gap, the beam connecting to the first appendage and the second appendage, the beam extending at an angle from a first surface of the first appendage and a second surface of the second appendage, the gap extending below the beam, the first appendage being opposite the gap from the second appendage; the first appendage and the second appendage being fastened to a forged body of the suspension bracket assembly via a first set of first fasteners; the first appendage and the second appendage being fastened to a plurality of bushing pins via a second set of second fasteners.

18. The stamped plate of claim 17, wherein the first appendage and the second appendage are tabs and are symmetrical, the first appendage, the second appendage, and the beam having curved edges shaping the gap.

19. The stamped plate of claim 17, wherein the bushing pins support a control arm, the bushing pins extend into an opening of the control arm, the control arm hingingly couples to the plurality of bushing pins, the gap surrounds the control arm, and the control arm is inboard of the first appendage and the second appendage.

* * * * *